(12) United States Patent
Adams et al.

(10) Patent No.: US 12,165,446 B1
(45) Date of Patent: Dec. 10, 2024

(54) ERROR ESTIMATION SYSTEMS AND METHODS

(71) Applicant: Zoox, Inc., Foster City, CA (US)

(72) Inventors: Derek Adams, Pasadena, CA (US); Yan Cui, Palo Alto, CA (US); Nathaniel Kaiser, Boston, MA (US); Guillermo Duenas Arana, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 338 days.

(21) Appl. No.: 17/550,880

(22) Filed: Dec. 14, 2021

(51) Int. Cl.
*G07C 5/08* (2006.01)
*G06F 18/21* (2023.01)
*G07C 5/00* (2006.01)

(52) U.S. Cl.
CPC ....... *G07C 5/0841* (2013.01); *G06F 18/2193* (2023.01); *G07C 5/006* (2013.01); *G07C 5/0816* (2013.01)

(58) Field of Classification Search
CPC .... G07C 5/0841; G07C 5/006; G07C 5/0816; G06F 18/2193
See application file for complete search history.

(56) References Cited

U.S. PATENT DOCUMENTS

| | | | |
|---|---|---|---|
| 2018/0188032 A1* | 7/2018 | Ramanandan | G01S 19/52 |
| 2019/0049968 A1* | 2/2019 | Dean | G06V 20/58 |
| 2021/0065473 A1* | 3/2021 | Diehl | G01S 13/931 |
| 2022/0055655 A1* | 2/2022 | Navas Sanchez | G01C 21/04 |

\* cited by examiner

*Primary Examiner* — James M McPherson
*Assistant Examiner* — Paulo Roberto Gonzalez Leite
(74) *Attorney, Agent, or Firm* — EIP US LLP

(57) ABSTRACT

Techniques described herein comprise receiving, from a first measurement system associated with a vehicle, first measurement data taken at a first time and second measurement data taken at a second time, different from the first time. Third measurement data taken at the first time and fourth measurement data taken at the second time is received from a second measurement system associated with the vehicle. A probability is determined that an error has occurred in the vehicle based on the first, second, third and fourth measurement data; and the vehicle is controlled based at least in part on the determined probability.

20 Claims, 9 Drawing Sheets

ERROR ESTIMATION SYSTEMS AND METHODS

BACKGROUND

Various systems rely on sensor information to provide information, such as in the case of vehicles, position and/or orientation information about the vehicle may be received or derived from multiple sensors. That information may be determined with respect to one or more coordinate systems. In complex systems in which various components and subcomponents use differing coordinate systems, there is a possibility for unintended, and potentially unsafe, behavior of the system.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
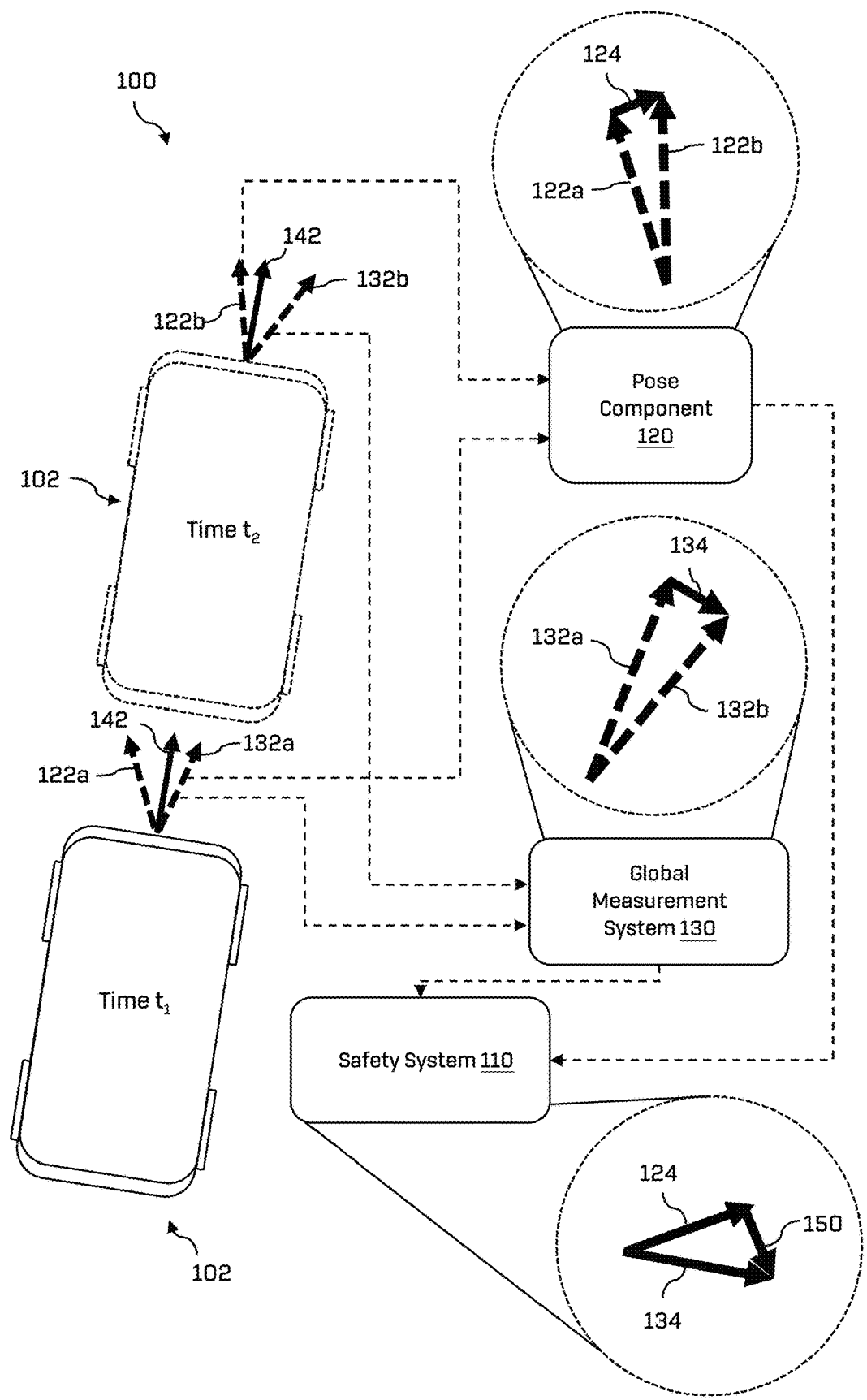
FIG. 1 is an example scenario illustrating an inconsistency including a vehicle.

This disclosure describes procedures, as well as methods, techniques, systems and computer-readable media for determining whether an error may have occurred. These can be used to determine the probability that an error has occurred, or is occurring, in various systems, including autonomous vehicles. Safety in such systems is a critical aspect of operation and establishing the probability that an error has occurred becomes increasingly complex as the system itself becomes more complex. The techniques described herein provide procedures for estimating a probability of an error and potentially taking action based on that probability which is widely applicable and has relatively simple computational requirements.

Generally, the procedure comprises receiving measurement data generated by at least two different sensor systems which generate comparable data associated with the system and determining a probability of an error based on the data. The measurement data may correspond to physical measurements taken of the system and/or measurements derived from other data associated with the system. In the case of an autonomous vehicle, the measurement data may correspond to localization data of the vehicle, for example a measured position and/or orientation of the vehicle (in any number of dimensions), herein also referred to as the vehicle's pose.

An example of a sensor system associated with an autonomous vehicle is an inertial measurement system, also referred to herein as a pose component, configured to determine inertial pose data for the vehicle. As used herein, a pose component may include a high frequency subcomponent (e.g., 100 Hertz, 200 Hertz, etc.) configured to determine a location and/or velocity of a vehicle operating in an environment based at least in part on inertial sensor data captured by one or more inertial sensors such as inertial measurement units (IMUs).

An inertial pose may refer to the position of an autonomous vehicle which may be updated in real-time or near real-time. According to some examples, data describing a inertial pose may include one or more of an x-coordinate, a y-coordinate, a z-coordinate (or any coordinate of any coordinate system, including polar or cylindrical coordinate systems, or the like), a yaw value, a roll value, a pitch value (e.g., an angle value), a rate (e.g., velocity) and the like. Inertial pose may be calculated or otherwise determined using sensor inputs such as steering angle, wheel speeds, and/or IMU measurements.

Another example of a sensor system associated with an autonomous vehicle is a global measurement system. A global measurement system may operate at a lower frequency relative to the pose component and may generate global data, also referred to herein as global pose data, that may overlap with local data produced by the pose component. The global measurement system may produce the global data based on a wider variety of input information than the inertial measurement system. The more frequent, or smooth, output of local pose data from the pose component may complement the global measurement system's less frequent global pose data.

Typically, a pose component and global measurement system operate in cooperation to localize the vehicle. They may output substantially the same data, such as a position and/or orientation but the data is likely not to be exactly the same due to, for example, inherently variability between the sensors based on environmental conditions, timing differences, algorithms, etc. As such, a variable and non-uniform amount of divergence between the two is expected, making it difficult to employ simple differences for determining whether an error has occurred. As will be described in detail herein, statistical methods may be used to develop a map of likelihoods (or probabilities, certainties, etc.) with respect to divergences between the various pose generating systems. The divergence may then be referenced in the map to provide an indication of whether the pose systems are behaving nominally or not.

As discussed above, example techniques comprise receiving measurements from two sensor systems associated with a vehicle. It may be determined how far respective measurements have changed in time relative to one another, and then this can be used to determine a probability of an error. The time period may be relatively short, such as less than 10 seconds, less than 5 seconds, about 1 second, etc. to allow an accuracy in one system over shorter time periods to give more confidence. In particular, a parameter may be determined that quantifies the difference between the differences between respective measurements. The two measurement systems may be the pose component and global measurement system discussed above. In another example, the two measurement systems may both correspond to individual IMUs. For instance, an autonomous vehicle may comprise a plurality of IMUs, wherein at least two of the plurality of IMUs may be generating data corresponding to the same physical quantity of the vehicle so that the failure of one of the IMUs can be compensated for by the working IMU. In this case, the divergence in the outputs of the IMUs may indicate that an error has occurred in at least one of the IMUs. For example, if the data from first system differed by a value of 1 between the start and the end of the time period and the data from the second system also differed by a value of 1 between the start and end of the time period, the change is zero. However, if the data from the first system differed by a value of 1 between the start and end of the time period and the data from the second system differed by a value of 2 between the start and end of the time period, the difference between the differences is 1 over the time period. (These values are purely for simplicity of explanation.) Use of the difference of the differences in this way may be more accurate than comparing absolute differences between two systems.

Based on the determined differences of the respective measurements over time, the procedure may comprise determining a probability that an error has occurred on the vehicle. In particular, the determined parameter may be used to determine a probability that an error has occurred. In some examples, determining an error may involve using the parameter and previously obtained reference measurement data representing a substantially accurate account of a previous operation of a vehicle. For example, a calibration procedure may have been carried out which for the sensor systems, during which it can be assumed that they are operating normally, such as without a serious error or malfunction. Data gathered from such a calibration procedure, or procedures, may form the previously obtained reference measurement data. For example, the data output by the inertial pose and the global pose during a calibration run of an autonomous vehicle may form the previously obtained reference data.

In another example, the reference measurement data may further comprise ground truth data representing an actual course taken by a vehicle. Ground truth data may therefore represent the most accurate account of a vehicle's trajectory and can be obtained during standard operation or during a calibration run of the vehicle. When ground truth data is available it may provide an indication of absolute error which feeds into the determination of the probability of an error and/or it may be used in place of some of the sensor data. For example, when the data is inertial pose and global pose, the ground truth data may be used in place of the inertial pose on the assumption that the inertial pose is generally accurate over short time periods and so its difference will closely approximate the ground truth data in that case.

In a further example, the reference measurement data may comprise data generated during one or more simulations representing simulated operation of a vehicle. The one or more simulations may correspond to a calibration operation, as described above, but run in software.

The reference measurement data may correspond to a vehicle that is not the same as the vehicle from which the measurement data is obtained. For instance, reference measurement data may be obtained from a first vehicle and applied to an error estimation system associated with a second, different, vehicle. Where the reference data is from a different vehicle, it may be from a vehicle of the same type and/or having one or more of the same sensors, pose systems (e.g., local and/or global), etc. For example, the vehicles of the same model or based on the same platform (such as sharing a basic chassis) are likely to have a similar dynamic response so reference measurement data of those vehicles applies to other vehicles. In other examples, the other vehicle may be of the same configuration, possibly down to the construction of the sensor systems themselves. This may be useful when a change of sensor system alters its operation (such as an improvement in resolution, frequency of output, and so on). Alternatively, the reference measurement data may correspond to the vehicle from which the measurement data is received. Such reference measurement data may be obtained during one or more calibration runs of the vehicle.

In some examples, an array may be generated using the reference measurement data. The array may be a histogram comprising elements which may be populated based on the reference measurement data. In some examples, respective differences between measurements from the two measurement systems, in a predetermined time window, may be calculated for at least a subset of the reference measurement data. The difference between these differences may then be calculated for each time window in the reference measurement data. This is similar to how the parameter is calculated based on real-time measurement data, as discussed above, except this is performed on the full set of reference measurement data to generate a plurality of differences.

The histogram can then be populated by aggregating each of the calculated differences into respective bins. The array may then be normalized so that individual elements of the array may be interpreted as respective probabilities. In other examples, the elements of the array may be populated based on a statistical distribution using the reference measurement data. For example, this could use a cumulative density function. In some examples the array is predetermined and does not change during vehicle operation.

In some examples, the probability that an error has occurred comprises determining a value in the array based on the determined differences of the respective measurements over time. In some cases, the value(s) of the differences may be used to locate an element of the array, for example an element whose labelled position in the array coincides with the difference values. The value associated with the element may then be read off to determine a probability of an error.

The procedure may then comprise determining whether the computed probability is sufficient to require the vehicle to perform a corrective operation, so that it is indicative of an error or malfunction or is indicative of normal operation of the vehicle. For example, the safety system may determine that the probability is above a predetermined threshold and so a corrective operation is required. This may involve causing the vehicle to perform a corrective maneuver such as a non-emergency stop, or an emergency stop.

Determining the probability that an error has occurred may comprise analyzing a set of probabilities and associated relative times and determining whether the set of probabilities indicates an error has occurred. For instance, it may be determined that a predetermined fraction of the most recent set of probabilities, such as at least 50%, at least 60%, at least 70%, at least 90% or at least 95% of the set of probabilities exceed a predetermined threshold value, and therefore that it is likely that an error has occurred. In another example, a contiguous sequence of probabilities exceeding a threshold value may be determined as likely that an error has occurred. The sequence can be a predetermined number of probabilities, or probabilities within a predetermined time window (such as 5 seconds, 10 seconds, etc.). In addition, or in the alternative, a trend may be determined from the tracked parameter value (e.g., the error is increasing, decreasing, or remaining constant).

The procedure may involve determining a course, also referred to as a path, of the parameter over time. For example, the parameter's evolution in time may be determined. That is, measurement data may be received for a number of time windows, contiguous or overlapping in time, and a parameter computed for measurements corresponding to each time window. Determining the course of the parameter over time may be used to determine certain problems associated with autonomous vehicles. In one example, driveline calibration errors may occur following a calibration of a vehicle. Driveline calibration errors involve the vehicle moving in such a way that the pose component measures a velocity which is not in line with the drive direction of the vehicle. This creates contention between the global and inertial systems because the global system is constantly correcting for this slight anomalous drive error. The course of the parameter may provide an indication that a driveline calibration error is occurring because the course of the parameter will be clustered in a region of probability that suggests that an error is occurring. For instance, in the histogram example described above, the course of the parameter may be mapped onto the histogram, and clustered around a region of the histogram in which elements have generally low probability values, indicating a driveline calibration problem rather than an error requiring a stop action. In that case the system may provide an indication that servicing, or recalibration is required. In at least some examples, the trend of the data may provide an indication to the vehicle to modify one or more components and/or behaviors. As a non-limiting example of such, if a trend is increasing, the vehicle may favor maneuvers which are more limiting (e.g., driving more slowly, providing larger berths around obstacles, etc.).

The techniques discussed herein may improve the functioning of an autonomous and/or semi-autonomous vehicle in many ways. In some examples, the safety system determines a probability that an error has occurred, or is occurring, based on easily obtainable measurement data, and using less computational power than is typically required to determine such an error.

It will be appreciated that a probability of an error can equally be expressed as a probability of normal operation. For example, a 5% probability of error is a 95% probability of normal operation. The procedures and concepts described herein can may use a probability of an error or a probability of normal operation. For example, where the probability of an error is compared to a threshold and action caused to be taken if it is above the threshold, a probability of normal operation can equally be compared to a corresponding threshold and action caused to be taken if it is below the threshold.

The methods, apparatuses, and systems described herein can be implemented in a number of ways. Example implementations are provided below with reference to the following figures. Although discussed in the context of an autonomous vehicle system in some examples below, the methods, apparatuses, and systems described herein can be applied to a variety of systems. Additionally, or alternatively, the techniques described herein can be used with real data (e.g., captured using sensor(s)), simulated data (e.g., generated by a simulator), or any combination thereof.

FIG. 1 illustrates an example scenario 100 including a vehicle 102. The vehicle 102 may be an autonomous vehicle. The vehicle 102 may include a vehicle computing device and may be part of a vehicle system that includes one or more remote computing devices.

Figure 2:
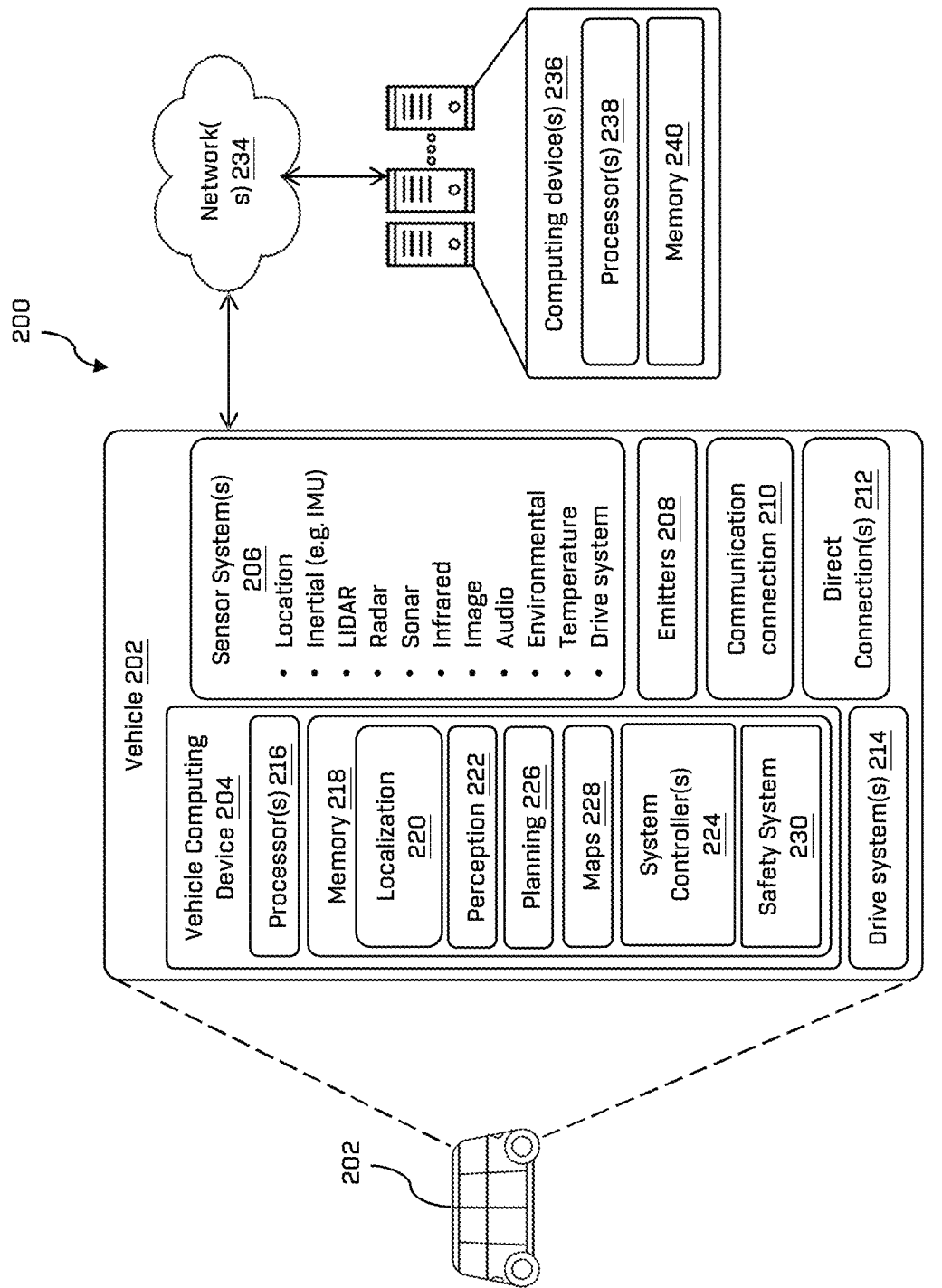
FIG. 2 depicts a block diagram of an example vehicle system.

An example of a vehicle system 200 is depicted in FIG. 2. In some instances, the vehicle system 200 may include a vehicle 202, which may correspond to the vehicle 102 of FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 202 may be a fully or partially autonomous vehicle having any other level or classification. Moreover, in some instances, the techniques described herein may be usable in conjunction with non-autonomous vehicles as well.

The vehicle 202 may include vehicle computing device(s) 204, one or more sensor systems 206, one or more communication connections 210, at least one direct connection 212 (e.g., for physically coupling the vehicle 202 to exchange data and/or to provide power), and one or more drive systems 214.

In some instances, the sensor(s) 206 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 206 may include multiple instances of each of these or other types of sensors. For instance, the LIDAR sensors may include individual LIDAR sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204.

The inertial sensors may be inertial measurement units (IMUs) that include gyroscopes to measure and report angular rate and accelerometers to measure and report specific force. The IMUs may include other components such as magnetometers to measure the magnetic field surrounding the system. The IMUs may output respective IMU measurements (e.g., sets of measurements from the components of each IMU) to a pose component associated with the vehicle. The pose component receives measurement data from the one or more IMUs and outputs localization data representing the vehicle's position. This will be discussed further below with reference to FIG. 3.

Returning now to the example of FIG. 1, one or more sensors, such as sensors 206, may be included in the vehicle 102 in order to detect objects and data relating to those objects in the environment surrounding the vehicle. For example, as shown in FIG. 1, sensors (not shown) provided at an end of the vehicle 102 may be configured to monitor the environment in front of the vehicle 102. The sensors may be configured to detect objects in front of the vehicle 102 as well as data relating to the objects such as their position within the environment and/or data relating to their movement within the environment.

The sensors of the vehicle 102 of FIG. 1 may be configured to provide the data as inputs to a vehicle computing device, such as the vehicle computing device(s) 204 of FIG. 2, and particularly to one or more processors for use in operating components stored in memory of the vehicle computing device. As can be seen from FIG. 2, the vehicle computing device(s) 204 may include one or more processors 216 and memory 218 communicatively coupled with the one or more processors 216. In the illustrated example, the memory 218 of the vehicle computing device(s) 204 stores a localization component 220, a perception component 222, a planning component 226, one or more maps 228, one or more system controllers 224, and a safety system 230. Though depicted in FIG. 2 as residing in memory 220 for illustrative purposes, it is contemplated that the localization component 220, perception component 222, planning component 226, safety system 230 and/or the one or more maps 228 may be accessible to the vehicle 202 (e.g., stored on, or otherwise accessible by, memory remote from the vehicle 202).

An example of this remote memory is the computing device 236. The computing device 236 may include one or more processors 238 and memory 240. Although not depicted here, in some instances the computing device 236 may store the above-referenced components and controllers. The processor 216 may access these as required from the computing device 236 via the network 234 that connects the vehicle 202 and the computing device 236.

In some examples, the vehicle 202 may send operational data, including raw or processed sensor data from the sensor system(s) 206, to one or more computing device(s) 216 via the network(s) 234.

In some instances, the perception component 222 may include functionality to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception component 222 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The sensors of the vehicle 202 may provide the data relating to the objects in the environment as inputs to a perception component of the vehicle computing device, such as perception component 222. The perception component may use the data to perform object detection, segmentation, classification, and other data processing to determine characteristics about the objects.

The perception component 222 may assign identifiers to the objects sensed in the environment to enable the object to be tracked within the environment. The perception component may determine values associated with the objects based on the data received from the sensor, to create a data object for each of the objects. It will be appreciated that, although the objects are physical objects sensed in a real-world environment by the vehicle in this example, in other examples the objects may be objects displayed and used in a simulation, or may be objects identified within video data. Simulation data may be received from a planning component such as planning component 226 or localization component such as localization component 220, or from a remote device, such as remote computing device 236. In some examples, the data may comprise map data received from the maps 228 or the other components in memory.

The data gathered may be communicated from a starting, first component, e.g., the processors of the vehicle, to a target, second component, such as a different device, different hardware, or different software. The term component is here used to refer to devices, hardware, software, or other features of a computing system to which data may be transferred, and is distinct from the use of component in relation to the software components of the vehicle such as the perception, localization, or planning components. It will be apparent from the context in which the term component is used which of these is being referred to. In some examples, the data may be transferred between two software applications. The software applications may operate within the vehicle computing device and be stored in memory of the vehicle computing device, or may be in remote computing devices. For example, referring to FIG. 2, the data may be transferred from the perception component 222 to other software components stored in the memory 218 of the vehicle, such as the localization component 220 or planning component 226. In some instances, the data may be transferred from the perception component 222 to the remote computing device 236 via the communication connection 210 and network 234.

The localization component 220 may be configured to receive data from the sensor system(s) 206 to determine a position and/or orientation of the vehicle 202 (e.g., one or more of an x-, y-, z-position, roll, pitch, or yaw). For example, the localization component 220 may include and/or request/receive a map 228 of an environment and may continuously determine a location and/or orientation of the autonomous vehicle within the map 228.

Figure 3:
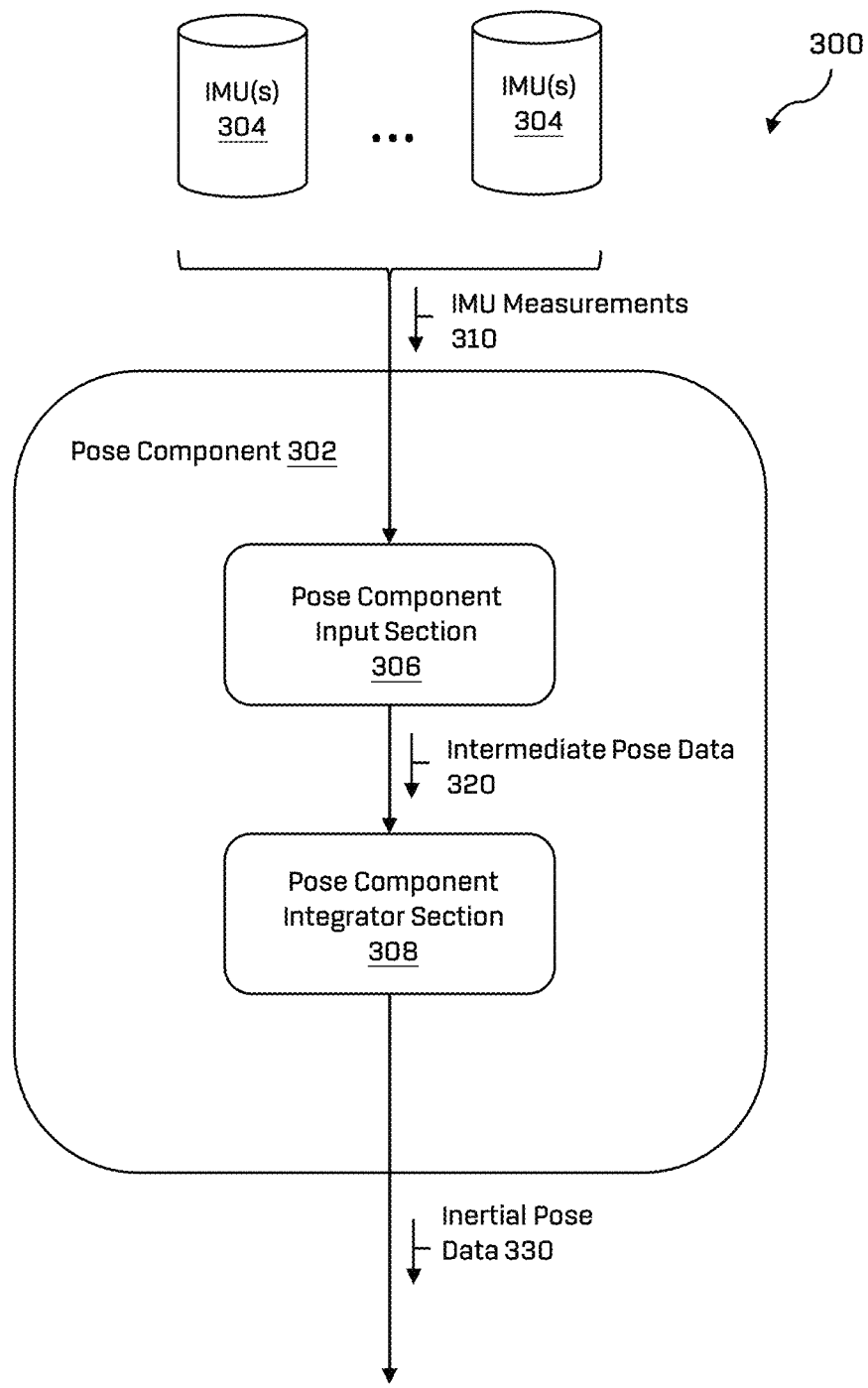
FIG. 3 is an example inertial measurement system used to generate inertial measurements.

The localization component 220 may comprise an inertial measurement system, also referred to herein as a pose component, that is configured to generate inertial measurement data, also referred to herein as inertial pose data, associated with the vehicle 202. FIG. 3 illustrates example architecture 300 configured to generate inertial pose data 330, and which may comprise one or more IMUs 304 and a pose component 302. The pose component 302 may comprise a pose component input section 306 and a pose component integrator section 308. The pose component input section 306 may be configured to receive a plurality of signals from various sensors associated with the vehicle (including one or more IMU(s) 304), and output intermediate pose data 320 based on the received signals and information which may be provided to the pose component integrator section 308.

In addition to the input from one or more IMUs 304, the pose component 302 may be configured to receive additional signals that allow it to generate the inertial pose data 330. For example, the pose component input section 306 may include one or more signal monitors including a brake status monitor, a steering angle monitor, a wheel scale monitor, a wheel speed monitor, and a roll-pitch monitor. Further, the pose component input section 306 may include a wheel speed correction component, a rollpitch initializer component, a roll-pitch switch component, and a pose component input component.

In operation, the one or signal monitors may monitor respective signals that may be received as input by the pose component input section 306 or that may be calculated based on signals received as input. In the illustrated example, the brake status monitor may monitor a brake status signal, the steering angle monitor may monitor a steering wheel angle signal, the wheel scale monitor may monitor a wheel scale signal, the wheel speed monitor may monitor a wheel speed signal, and the roll-pitch monitor may monitor a roll-pitch signal determined by the roll-pitch switch based at least on a roll-pitch data signal as discussed below. The pose component input component 306 may output intermediate pose data 320 based on the received signals and information to the pose component integrator section 104.

The pose component integrator section 308 may receive the intermediate pose data 320 from the pose component input section 306. The pose component integrator section 308 may include at least one of a simple integrator component, a Kalman filter component and an inertial integrator component. The simple integrator component and Kalman filter component may be configured to generate a location and/or velocity based on the intermediate pose data 320. More particularly, the simple integrator component may generate and output a simple integrator velocity and the Kalman filter component may generate and output a Kalman filter velocity. In some examples, the simple integrator component may operate to receive wheel speed data to get a translational velocity and receives gyroscope data to get a rotational velocity. The simple integrator component may be used to provide velocity estimate, which can be used to determine pose for executing safe-stop trajectory or no-go trajectory based on the translational velocity and rotations velocity. In addition, the simple integrator component may be stateless (e.g., it does not need to be initialized to operate). In some examples, the Kalman filter component may operate to perform a sensor fusion with noise models associated with wheel speed, accelerometers, gyroscopes, and a global velocity from global pose solver. The Kalman filter component may utilize a probabilistic sensor fusion to estimate a velocity. In some examples, the Kalman filter component may be more robust to error such as wheel slip.

The inertial integrator component may receive one or more of the simple integrator velocity and/or Kalman filter velocity and determine the inertial pose 330 based thereon. For example, by integrating a velocity of the vehicle including the pose component over time, the inertial integrator may determine an inertial pose of the vehicle. For example, the velocity of the vehicle may be utilized to determine an updated location of the vehicle. Some examples may further include a constraint such as a complementary filter to further smooth the updates of the inertial pose.

Referring back to FIG. 2, the localization component 220 may further comprise, or receive data from, a global measurement system configured to generate global localization data. A global measurement system may receive pose information from one or more sensor systems associated with the vehicle to determine a position of the vehicle with respect to a global reference, such as a map. The received pose information may be both relative and absolute. Relative pose information may be received by one or more local measurement systems, such as a pose component described above. Absolute pose information may be received by one or more remote systems that localize the vehicle 200 at some position with respect to the surface of the Earth. Such absolute pose information may come from one or more global navigation satellite systems (GNSS), such as Global Positioning System (GPS). Absolute pose information may additionally, or alternatively, be derived from landmarks in the vicinity of the vehicle 200 and used to localize the vehicle 200 with respect to a map. For example, imaging sensors associated with the vehicle 200 may indicate the existence of a landmark in the vicinity of the vehicle. The indication may be used to localize the vehicle 200 by locating the vehicle at some position with respect to the landmark on a map. The global measurement system may combine the relative and absolute pose information to localize the vehicle with respect to a position on the Earth's surface and therefore provide a global indication of the vehicle's pose.

Data output from the pose component and global measurement system may be received by the safety system 230, which as discussed above may be stored locally on the vehicle, or stored remotely, such as in the computing device(s) 236. As will be discussed in further detail below, the safety system 230 may determine a probability that an error has occurred based on the received measurement data. Based on the determined error, the safety system 230 may communicate with the system controller(s) 224 to indicate that an error is likely to have occurred or is occurring.

A communication connection 210 may enable communication between the vehicle 202 and one or more other local or remote computing device(s). For instance, the communication connection(s) 210 may facilitate communication with other local computing device(s) on the vehicle 202 and/or the drive system(s) 214. Also, the communication connection(s) 208 may additionally or alternatively allow the vehicle 202 to communicate with other nearby computing device(s) (e.g., other nearby vehicles, traffic signals, etc.). The communication connection(s) 210 may additionally or alternatively enable the vehicle 202 to communicate with a computing device 236. The computing device 236 may be at a remote location from the vehicle and the vehicle may communication with the computing device 236 over a network 234.

It will be appreciated that data relating to objects in the environment is used as an example in FIG. 1, but that data may be transferred between different starting and target components, such as between different vehicle hardware, devices, or systems, between the vehicle and remote hardware, devices, or systems, internally between components of computing devices other than the vehicle, or between different computing devices other than vehicle. For example, within the vehicle 202, map data may be transferred from the one or more maps 228 of the vehicle memory 218 to the localization or planning components 220, 226. In some examples, data may be transferred from the planning component 226 to the system controller 224 and/or one or more emitters 208. In some examples, data may be transferred from the system controller 224 to one or more drive systems 214.

To expand, the maps 228 may be used by the vehicle 202 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 228 may be stored based on, for example, a characteristic (e.g., type of entity, time of day, day of week, season of the year, etc.). Storing multiple maps 228 may have similar memory requirements, but increase the speed at which data in a map may be accessed.

The system controller 224 may be configured to control steering, propulsion, braking, safety, emitters, communication, and other systems of the vehicle 202. The system controller(s) 224 may communicate with and/or control corresponding systems of the drive system(s) 214 and/or other components of the vehicle 202. The system controller(s) 224 may be communicatively coupled to one or more sensors of the vehicle sensor system(s) 206.

Emitter(s) 208 may be provided for emitting light and/or sound, and may include interior emitters to communicate with passengers of the vehicle 202 and/or exterior emitter(s) to communicate with pedestrians or other nearby vehicles.

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 214. Furthermore, the drive system(s) 214 may also include one or more communication connection(s) that enable communication by the respective drive system with one or more other local or remote computing device(s).

In some instances, aspects of some, or all, of the components discussed herein may include any models, algorithms, and/or machine learning algorithms. For example, the component(s) in the memory 220, 240 may be implemented as a neural network. As can be understood in the context of this disclosure, a neural network may utilize machine learning, which can refer to a broad class of such algorithms in which an output is generated based on learned parameters. Data may be transferred within the models/algorithms, between different models/algorithms, or between the models/algorithms and other components of the vehicle.

Referring back to FIG. 1, a safety system 110 associated with the vehicle 102 receives measurement data from a pose component 120 and a global measurement system 130 and determines the probability that an error has occurred. In the example scenario 100, the vehicle 102 is on a constant heading 142 at both a first time, $t_1$, and a second time, $t_2$, shown as vectors having a magnitude and direction. The output of the pose component 120 may provide a first output of the heading 142 at a first time, $t_1$, shown as the vector 122a, and a second output of the heading 142 at a second time, $t_2$, shown as the vector 122b. Similarly, the output of the global measurement system 130 may provide a first output of the heading 142 at $t_1$ shown as the vector 132a, a second output of the heading 142 at $t_2$ shown as the vector 132b. The heading 142 and output headings 122a, 122b, 132a, 132b are shown for illustration purposes only. However, it is appreciated that the output headings 122a, 122b resulting from the pose component 120 and the output headings 132a, 132b from the global measurement system 130 differ substantially in direction in this example. This may indicate that an error has occurred on the vehicle 102 because the measurement data output by the pose component 120 and global measurement system 130 do not substantially coincide.

The safety system 110 may be configured to determine the probability that an error has occurred based on the output headings 122a, 122b, 132a, 132b. In particular, the difference between the heading outputs 122a, 122b provided by the pose component 120 may be determined, this is depicted as the vector 124. Similarly, the difference between the heading outputs 132a, 132b provided by the global measurement system 130 may be calculated, this depicted as vector 134. Then the safety system 110 uses the difference between the vectors 124 and 134 representing respective differences between heading estimates in a time $t_2 - t_1$. The difference between the vectors 124 and 134 is depicted as the vector 150. The safety system 110 may then be configured to estimate the probability that an error has occurred based on the vector 150. This will be discussed presently with reference to FIG. 4. It will be appreciated that the example of FIG. 1 is simplified for the purposes of illustration, other examples may consider other output data alternatively or in addition to the heading data illustrated.

Figure 4:
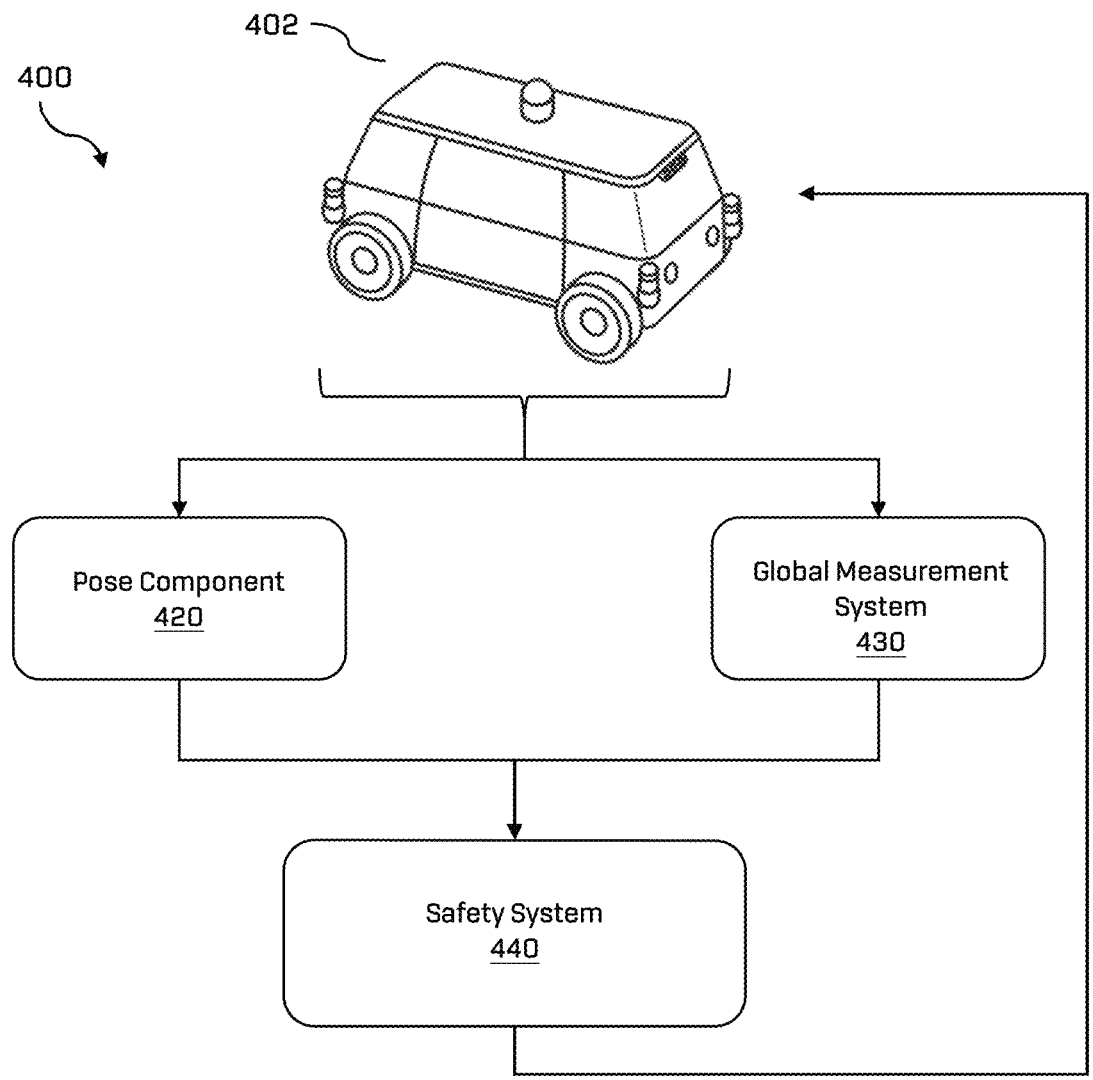
FIG. 4 is an example process for error estimation.

FIG. 4 illustrates an example process 400 in which a safety system 440 associated with a vehicle 402 may determine a probability that an error has occurred on the vehicle 402. As discussed above, the vehicle 402 is associated with a pose component 420 and a global measurement system 430, both of which generate their own respective localization data representing estimates of the position, velocity, heading, etc. associated with the vehicle 402. In operation, the safety system 440 receives measurement data from each of the pose component 420 and the global measurement system 430.

In particular, the safety system 440 receives, from the pose component 420, first measurement data taken at a first time and second measurement data taken at a second time, different from the first time. In one example, the first and second measurement data may be x, y, positional data representing estimates of the horizontal position of the vehicle 402. In this case, the measurement data may be a 2-tuple comprising elements that represent respective x, y positional data. It will be appreciated that other examples may use n-tuple data where is n is an integer greater than or equal to 1. In another example, the measurement data may comprise x, y, and an orientation. In this case the measurement data may be a 3-tuple comprising elements that represent respective x, y positional data and an angle representing orientation data. Other examples may be n-tuple and are not limited to 2 or 3. Some examples may be 6-tuple (such as, position and orientation in three dimensions), or greater than 6, for example if velocity in three dimensions is additionally included.

The safety system 440 further receives, from the global measurement system 430, third measurement data taken at the first time and fourth measurement data taken at the second time. The third and fourth measurement data represent estimates of the same physical property as that of the first and second measurement data. In the example described above, if the first and second measurement data represents inertial estimates of the horizontal position of the vehicle 402 at respective first and second times, then the third and fourth measurement data represents global estimates of the horizontal position of the vehicle 402 at the respective first and second times.

In some examples, the third and fourth measurement data may correspond to measurements taken at approximately the first and second times because the global measurement system 430 typically operates at a lower frequency than the pose component 420, and so the times that respective measurements are taken may not exactly coincide and or may not be exact multiples of the frequency of the pose component. This can be seen in FIG. 5, which illustrates example timestamps of global 502 and inertial 504 measurement data taken from a buffer over a one second window. The global measurement data 502 is generated at a frequency of 5 Hz while the inertial pose data is generated at a frequency of 205 Hz (shown at a wider spacing for clarity). A first global measurement is selected at a time 0.2 s, and a further global measurement is selected 1 second later, at a time 1.2 s. In this time window, four more global measurements have been taken in the interim but are not used. In this example then, the possible time windows for comparing measurements are defined by integer multiple of 0.2 s, and a 1 s time window is shown for illustration purposes only. In the inertial pose data, a first measurement is selected at a time corresponding to 0.2 s, and a second measurement is taken at a time corresponding to 1.2 s.

Referring back to FIG. 4, the safety system 440 may receive a stream of measurement data from each of the pose component 420 and global measurement system 430 representing at least one of: only those measurements at the time window's endpoints, a subset of fewer than all the measurements generated by the respective measurement systems, or every measurement generated by the measurement systems. The safety system may determine data elements that fall closest to the time window's endpoints, and thus which data elements should form the first, second, third and fourth measurement data.

The safety system 440 performs various computations on the first, second, third and fourth data to determine the probability that an error has occurred. The computations include determining a parameter that represents a measure of the relative differences of the measurement data in time. Specifically, the parameter, which will be referred to herein as $\Delta$, can be computed as follows. Suppose the first measurement data corresponds to a measurement taken at a time, $t_1$, and will be referred to as $x_i(t_1)$, wherein the subscript i indicates that the first measurement data is based on an inertial measurement. Further suppose that the second measurement data corresponds to a measurement taken at a time, $t_2$, and will be referred to as $x_i(t_2)$. Then, the change in inertial measurements within the time window of $|t_2-t_1|$ is represented by the difference in the first and second measurements, denoted as $\Delta_i$, and shown in equation 1.

$$\Delta_i = x_i(t_2) - x_i(t_1) \quad \text{Equation 1}$$

Similarly, suppose the third and fourth measurement data are taken at the respective times $t_1$ and $t_2$, and denoted respectively, $x_g(t_1)$ and $x_g(t_2)$, wherein the subscript g indicates that the third and fourth measurement data is based on global measurements. Then the change in global measurements within the time window $|t_2-t_1|$, denoted as $\Delta_g$, is given similarly by equation 2.

$$\Delta_g = x_g(t_2) - x_g(t_1) \quad \text{Equation 2}$$

The parameter, $\Delta$, can then be computed as the difference between (i) the difference between the first and second measurements ($\Delta_i$) and (ii) the difference between the third and fourth measurements ($\Delta_g$). Therefore, A can be written according to Equation 3.

$$\Delta = \Delta_i - \Delta_g \quad \text{Equation 3}$$

When the first, second, third and fourth measurement data represents multi-dimensional measurement data (for example, two or more of x, y, z position, yaw, roll and pitch, velocity etc.), then $\Delta$, $\Delta_i$, and $\Delta_g$ are also multi-dimensional. For example, if the measurement data comprises n measurements, then $\Delta$ could be represented as an n-tuple, a list of n values, a 1×n dimensional array, and an n-dimensional vector. In this case, the computation of A may be simply stated as the vector equation of Equation 4, wherein $\Delta$, $\Delta_i$, and $\Delta_g$ use the conventional bold notation to represent vectors comprising elements that correspond to the values of $\Delta$, $\Delta_i$, and $\Delta_g$ in each dimension.

$$\mathbf{\Delta} = \mathbf{\Delta}_i - \mathbf{\Delta}_g \quad \text{Equation 4}$$

Note that in the above example, A is calculated based on differences between inertial and global measurement data. It is understood that a similar technique may be applied to any two measurement systems, including measurement systems of the same type. For example, $\Delta$, may be determined based on measurements received from two separate inertial measurement systems. In this case, $\Delta$ may indicate the likelihood of an error in one of the two systems.

From the parameter, $\Delta$, the safety system 440 can determine a probability that an error has occurred. In an example, the probability can be determined based on the magnitude of A. For instance, a larger A may be indicative of a larger probability that an error has occurred because the difference between the difference between the respective measurements is larger over the time window. In a further example, the probability can be determined based on the phase and the magnitude of A. For instance, when A is multidimensional (for example when it is calculated according to Equation 4), A may be construed as a vector having a magnitude and a direction (phase). Errors may be dimensionally sensitive. For example, y-direction measurements may be generally more accurate than x-direction measurements for a particular measurement system. If A indicates a certain change in the y-direction, this may be more indicative of an error than the same change in the x-direction.

In yet another example, the determination of a probability is based on locating a value in an n-dimensional array, wherein each element of the array represents a probability that an error has occurred. In one case, the values comprised in the n-tuple, $\Delta$, are used to locate a value in the n-dimensional histogram. For example, if A is represented by an n-tuple, then $\Delta$ can be interpreted as a label locating a value in the n-dimensional array. This will now be discussed with reference to FIGS. 6A-6D.

Figure 6A:
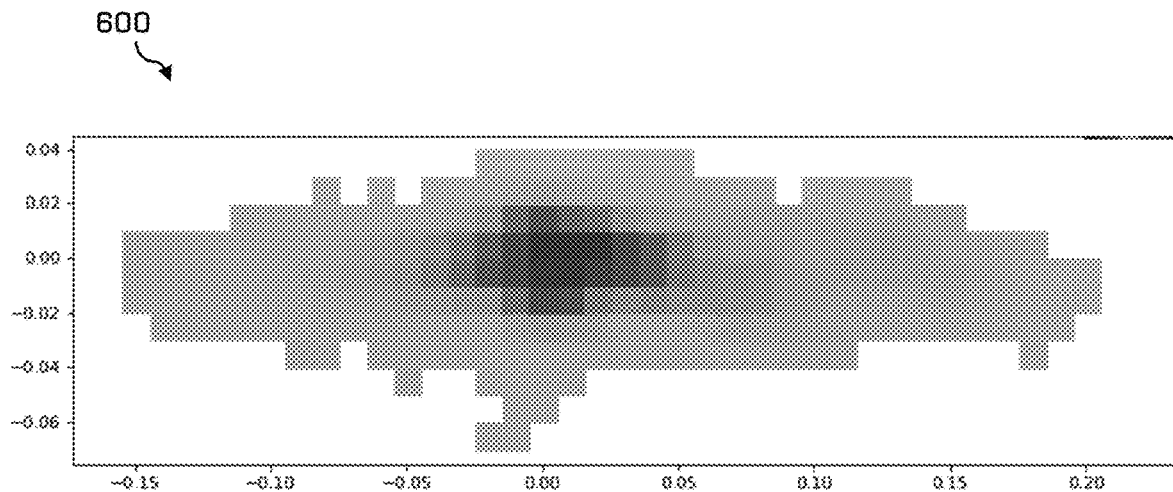
FIG. 6A depicts an example array that may be used to estimate errors.

FIG. 6A shows a graphical representation of an example array 600 that can be used to determine a probability that an error has occurred on an autonomous vehicle. In particular, the array 600 is a representation of a 2-dimensional histogram using the differences in the x- and y-positions generated by a pose component and a global measurement system of a vehicle during one or more calibration runs.

In general, elements of the histogram can be populated based on reference measurement data. Reference measurement data, also referred to as example, sample and ideal measurement data, refers to measurement data generated during an actual operation of the system, but which is known or assumed to be data during which the system operation did not encounter an error or is otherwise considered normal or nominal. As discussed above, actual operation may include physical operation of the system, or simulated operation of the system. In the case of an autonomous vehicle, the reference measurement data can be generated by measuring aspects of a vehicle's operation during one or more runs of the vehicle. This could be during normal operation of the vehicle or during multiple runs of a calibration of the vehicle. The term run here refers to any operation performed by the vehicle, such as particular maneuvers and/or actions.

The reference measurement data may comprise inertial measurement data (inertial pose data) generated during multiple calibration runs of the vehicle. Such data is easily obtainable as it may form part of the calibration data generated during each calibration run. In this way, the inertial measurement data roughly corresponds to correct, or normal, operation of the vehicle because it can be assumed that the vehicle is operating correctly during the calibration. Further, as previously discussed, inertial measurements can be assumed to be substantially accurate over short periods of time. The reference measurement data may also comprise global measurement data gathered from a global measurement system during the one or more runs. In this case, the global measurement data can be considered to provide an accurate (global) account of the run(s) because it can be assumed that the vehicle was operating correctly, or normally, when the measurement data was obtained.

Calculations similar to those described in Equations 1-4 may be performed on the reference measurement data to obtain a set of Δ values. For example, Δ may be calculated for every set of data points within the measurement data separated by the time window. We will refer to the values of Δ calculated from the reference measurement data as $\Delta_R$ to distinguish over A calculated from current measurement data. As described above, as each of the sets of measurement data are obtained during one or more runs of a vehicle that can be considered correct, the calculated $\Delta_R$ values can be considered to represent what would be expected in an ideal scenario. In some sense, $\Delta_R$ measures the systematic error in the system because any deviations between the measurements from the different measurement systems is representative of the inherent errors of the respective measurement systems. If the measurement systems were perfect, $\Delta_R$ would be zero at all time.

Figure 5:
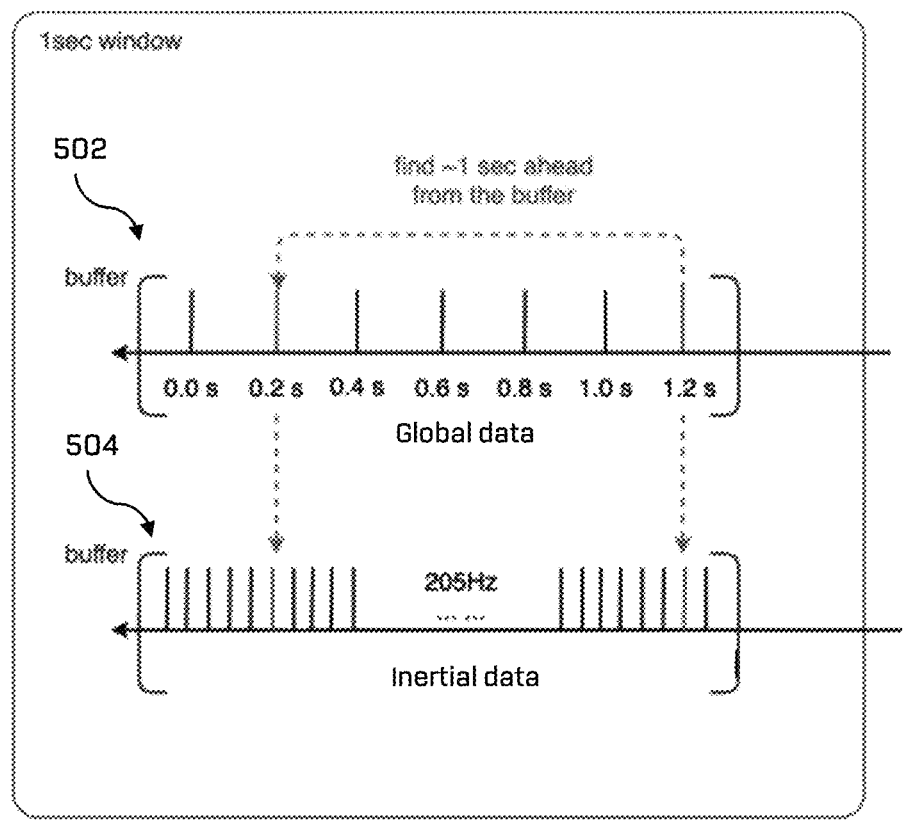
FIG. 5 depicts an example time window in which global and inertial measurements are selected.

$\Delta_R$ may be calculated based on any desired time period but will generally match time period over which the parameter is intended to be calculated in use. In the example of FIG. 5, a 1 second time period was used, but other examples may use other time periods, such 0.2 s (the smallest possible with the global measurement system output at 5 Hz) through to 2 seconds, 5 seconds or longer. Varying the time period acts as a filter. For instance, selecting a large time period, or time window, focusses more on lower frequency variations. Some examples may calculate A over more than one time period and have a corresponding $\Delta_R$ for each time period.

Based on the values of $\Delta_R$ calculated from the reference measurement data, a histogram can be populated by binning each $\Delta_R$ into respective bins based on their values. In the examples shown in FIGS. 6A-6D, the reference measurement data represents the x- and y-positional data taken during four calibration runs of an autonomous vehicle and $\Delta_R$ is expressed as a vector with components in the x and y dimensions over a time period of 1 second. The array 600 then represents a 2-d histogram, wherein each bin represents a change in divergence between the global and inertial pose by 0.01 m in x and y. $\Delta_R$ values are then binned based on their respective values.

To obtain probabilities from the elements of the histogram, each element may be normalized, such by dividing by the total number of values used to populate the array (e.g., by aggregating all changes in divergence over any number of runs of a vehicle, multiple vehicles, etc.). In FIGS. 6A-6D, regions of darker color indicate higher probabilities (of correct operation) because this is where the greatest number of results lay in the reference data. The probability that an error has occurred can be obtained by computing 1−[the value of the element]. As can be seen, the region of highest probability is clustered roughly around the point (0,0) indicating that it is most likely that the pose component and the global measurement system generally do not change relative to each other over the time window. FIG. 6A also shows how variation in normal operation is expected, and in the specific example of FIG. 6A, variation in a y direction may be more indicative of an error than in the x direction because x data spans −0.16 to 0.21 while y data spans −0.07 to 0.04.

Figure 6B:
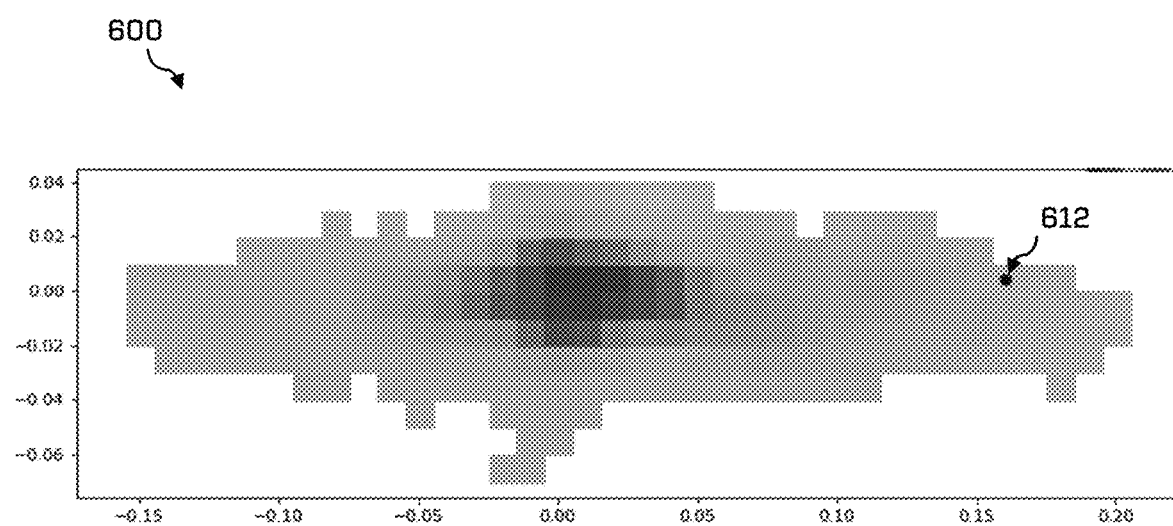
FIG. 6B depicts an example wherein the example array is used to estimate errors.

During an actual operation of a vehicle (such as a vehicle performing the maneuver and/or action associated with that used to generate the reference measurement data), the array 600 can be used to determine probabilities that an error has occurred by determining the value of the bin in which A, calculated as above for the actual operation, would be located. FIG. 6B shows a first visual example of this. Following the computations discussed above with regards to Equations 1-4, A can be computed for a single time period during operation of the vehicle. In the example shown in FIG. 6B, A has a value around (0.16, 0.00). This point is plotted in the histogram and shown as a dot 612. A is in a region of low, but not zero, indicating that that value was present in the reference data but was now very frequently encounter.

One or more rules implemented by the safety system may determine whether the probability of an error associated with A is above or below a threshold. If the probability is above a threshold, then it may be determined that an error has occurred, and the safety system may cause the vehicle to implement a corrective operation. For example, in the system 200, the safety system 230 may communicate with the system controller(s) 220 to indicate that an error is occurring and cause the system controller(s) 220 to implement a corrective operation such as a non-emergency stop, an emergency stop, a braking operation, an acceleration operation, a left turn, a right turn, and so on. The threshold may be set according to the sensitivity of the model. In this example, the threshold is set as a zero-probability of normal operation based on the reference data, in other words that the particular value was not observed at all in the reference data. In other examples, the threshold may be set at a suitable non-zero probability. The suitable non-zero probability threshold may be a pre-selected quantity based on an assumed acceptable level of error, so that values up to the threshold were observed a finite number of times in the reference data. In other examples, the suitable non-zero probability threshold may be a learnt quantity. Such a learnt threshold may be obtained via one or more machine learning algorithms, for example.

In some examples, the determined probability may be at least partially used to control the vehicle via one or more control operations. For example, the control operation may involve continuing on an existing course, if it is determined that the probability of an error is below a threshold. In another example, the control operation may involve performing a corrective operation, as described above. In any case, the control operation may be informed by the determined probability.

Figure 6C:
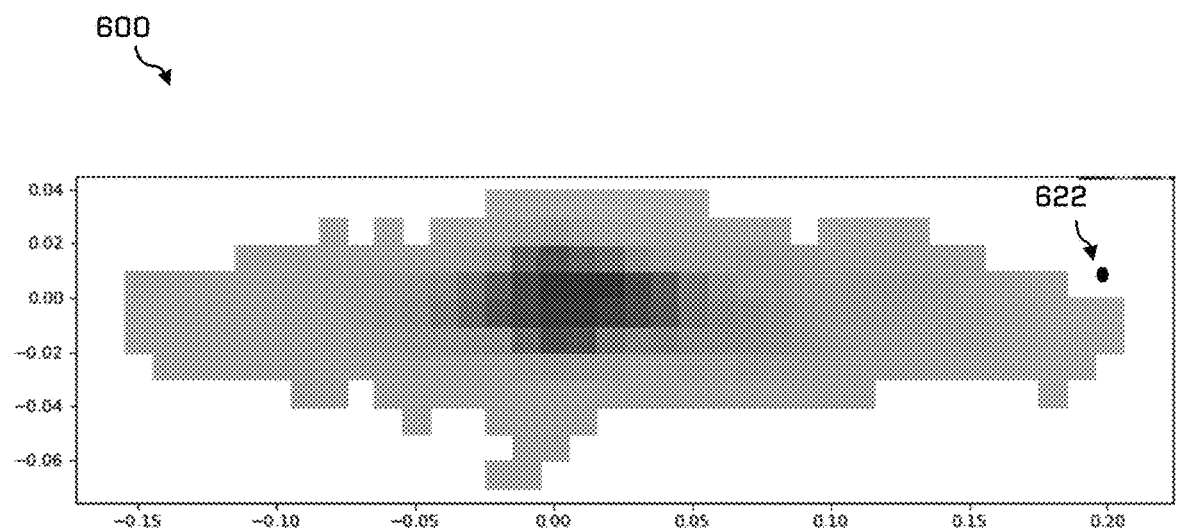
FIG. 6C depicts a further example wherein the example array is array used to estimate errors.

Now, with reference to FIG. 6C, at a later time to that of the example shown in FIG. 6B, A now has a value around (0.20, 0.01). This value of A is plotted in the array 600 as a dot 622. A is now outside of any regions having non-zero probability (of correct operation), which may indicate that an error is likely to have occurred because A has strayed from a region of low probability to a region of no probability (based on the reference data).

Alternatively, or in addition, the safety system 440 may determine that the probability is below a predetermined threshold for a first period of time. For example, A may occupy a region of low probability for the predetermined period of time (successive calculations of A may all have a low probability), and therefore this may indicate that an error has occurred. The safety system may cause a corrective operation to be performed in response.

A course of probabilities over time, or time evolution, of A forms a set and determining whether an error has occurred may involve performing analysis of this set. For instance, the safety system 440 may determine that a predetermined fraction of the set of probabilities exceeds a predetermined threshold value. This may indicate that A has occupied a region of (too) low probability for too long, and therefore an error is likely to have occurred.

Figure 6D:
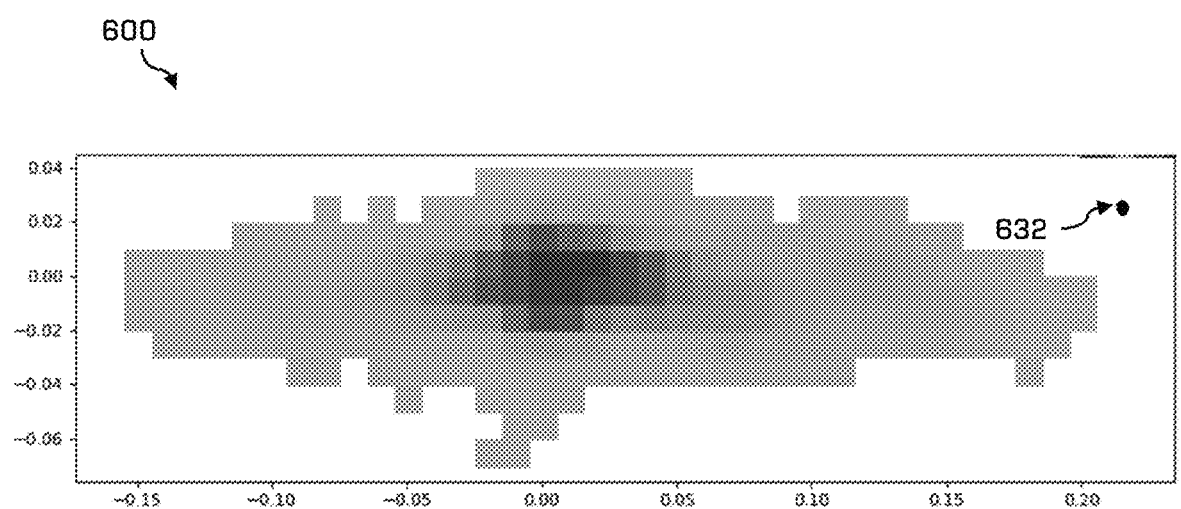
FIG. 6D depicts a further example wherein the example array is array used to estimate errors.

With reference to FIG. 6D, at an even later time in the operation of the vehicle, A now has a value around (0.22, 0.03). This value of A is plotted in the array 600 as a dot 632. A is now strayed even further into a region of zero probability indicating that an error is even more likely to have occurred.

Figure 6E:
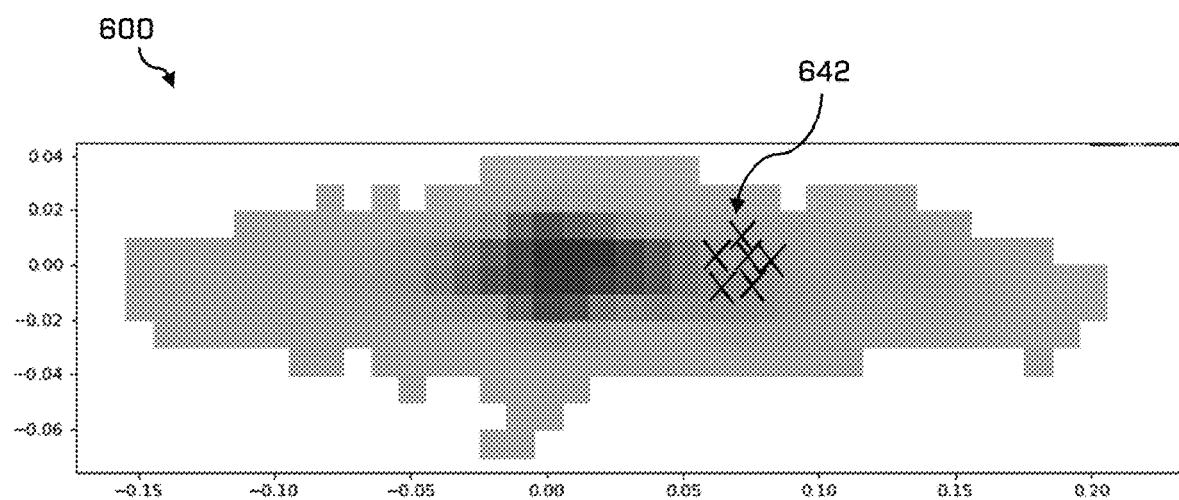
FIG. 6E depicts a further example wherein the example array is array used to estimate errors.

In some cases, a certain type of error can be associated with a certain clustering or course of A. For instance, a driveline problem, as discussed above, may be determined by establishing that A is occupying a particular region for at least a predetermined amount of time, and wherein the probability does not correspond to a maximum in the array of probabilities, such as the array 600. This clustering of A may be determined by analyzing a set of A, or probabilities corresponding to A, and determining that A has occupied a bounded region of non-maximal probability for the predetermined amount of time. Other examples may look for clustering of values in particular regions known to indicate a particular error, such as driveline problem. An example of clustering is depicted in FIG. 6E, where a cluster of values 642 depicted crosses occupy a region of low probability from the reference data. Regions indicative of particular errors may be determined by analyzing operational data of vehicles known to have the particular error, for example.

Other errors may be detectable by analyzing the course of A or the probabilities associated with it. For example, this may indicate that at least one of the global measurement system and pose component is not operating correctly, perhaps despite the values of A or the associated probability not in itself being sufficient to indicate that corrective action is required.

In some examples, a library of known errors may be generated by determining a relationship between a vehicle undergoing known problems with the respective courses of A. In operation, the safety system 440 may access the library to compare a current course of A with the trajectories stored in the library. Each course in the library may be associated with a known problem and may also be associated with a specific corrective action. For example, a driveline calibration problem may cause an indication that a recalibration is required. Other examples are possible.

In further examples, the elements of the array may not necessarily be scalar values representing probabilities. For example, each element may correspond to a function that is predetermined based on the reference measurement data. The functions may take the calculated Δ as an input and map A to a probability of an error. Such functions may be learnt, for example, using one or more machine learning algorithms or selected based on known operation of the vehicle. In other examples, the elements of the array may be vectors or data structures with at least two components.

Figure 7:
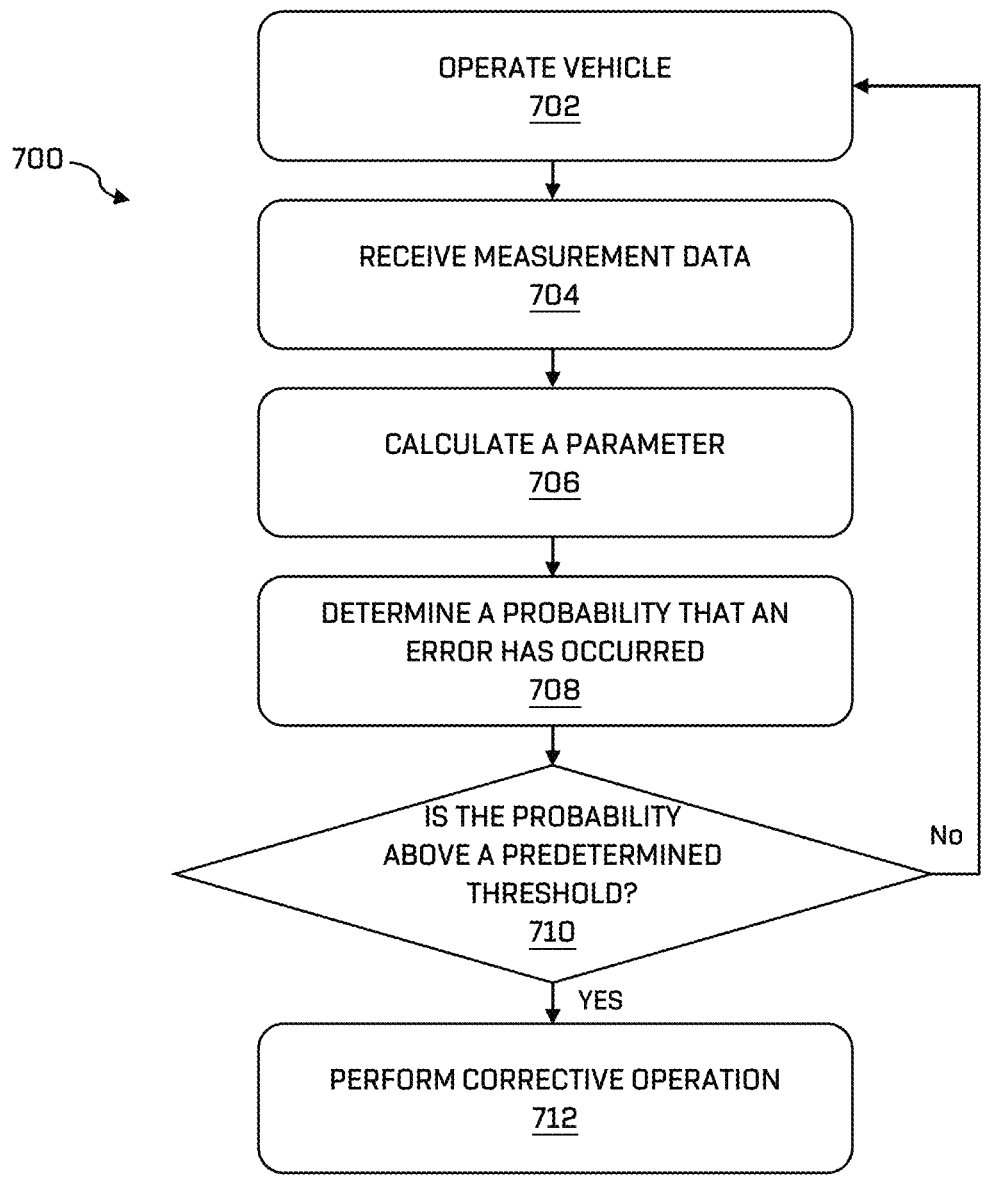
FIG. 7 depicts a flow chart of an example error estimation process.

FIG. 7 illustrates a flow chart of an example error estimation process 700. The error estimation process 700 may be performed by a safety system operating on an autonomous vehicle, or on a computing device in communication with an autonomous vehicle. The safety system may for example be the safety system 100, 230 or 440. The safety system may be caused to execute the process 700 by computer-readable instructions stored on a non-transitory computer-readable medium.

As can be seen in FIG. 7, the process 700 includes, at block 702, operating a vehicle for example an autonomous vehicle may be driven within an environment.

At block 704, the process 700 includes receiving measurement data for corresponding variables from at least two different sensor systems. The measurement data may coincide with the measurement data received from a pose component and a global measurement system, as discussed with reference to FIG. 4. Alternatively, the measurement data may be received from two separate inertial measurement systems, or even separate IMUs, associated with the vehicle. The measurement data may be multi-dimensional and correspond to a plurality of physical measurements taken of the vehicle.

At step 706, the process 700 includes calculating a parameter based on the received measurement data. Calculating the parameter may comprise calculating A as discussed above.

At step 708, the process 700 includes determining a probability that an error has occurred, based on the calculated parameter. This could be performed according to one or more of the examples discussed with regards to FIGS. 6A-6E. For example, determining a probability that an error has occurred may comprise determining a value in an array, matrix, grid, or other multi-dimensional data structure, comprising a plurality of values representing respective probabilities that an error has occurred on the vehicle. The values may be predetermined from reference measurement data representing a substantially accurate account of a previous operation of a vehicle. The reference measurement data comprises reference global measurement data and one of ground truth data representing an actual course taken by a vehicle or inertial measurement data generated during a calibration procedure of a vehicle. The array may correspond to a histogram.

At step 710, the process 700 includes determining whether the probability is below a predetermined threshold. This may further involve determining whether the probability is below the predetermined threshold for a first period of time. If it is determined that the probability is above the predetermined threshold, the process 700 proceeds to 702, wherein the vehicle is operated according to standard procedure. If it is determined that the probability is below the predetermined threshold, then the process 700 proceeds to step 712, wherein a corrective operation is performed.

In further examples, data from at least two different sensor systems can be compared over a time window to determine a probability of an error in further ways. For example, rather than the calculations above, a machine learning algorithm may be trained using the reference data discussed above as an example of "normal" operation. Inputs corresponding to "normal" operation used as training data may be the measurement data from each of the two systems separated by the time period used in the calculation of A discussed above and which populated the array depicted in FIG. 6A. Once trained, rather than follow the calculations of Equations 1-4, the machine learning algorithm may output a probability of "normal" operations when supplied the measurement values during operation of a vehicle. Such machine learning algorithms could also be trained on reference data indicating known errors, such as a driveline calibration problem, to identify the probability of that occurring. Similar to the reference data discussed above, such a machine learning algorithm could apply to all vehicles, a general type of vehicle, a specific model of vehicle, or a particular configuration of a vehicle.

EXAMPLE CLAUSES

A: A system comprising: one or more processors; and a memory storing processor-executable instructions that, when executed by the one or more processors, cause the system to perform operations comprising: receiving, from an inertial measurement system associated with an autonomous vehicle, first inertial measurement data taken at a first time and second inertial measurement data taken at a second time different from the first time, wherein the first and second inertial measurement data represents inertially measured positions of the autonomous vehicle at the respective first and second times; receiving, from a global measurement system associated with the autonomous vehicle, first global measurement data taken at the first time and second global measurement data taken at the second time, wherein the first and second global measurement data represents globally measured positions of the autonomous vehicle at the respective first and second times; calculating a parameter representing the difference between: the difference between the first and second inertial measurements, and the difference between the first and second global measurements; locating an element in an array based on the parameter, wherein the array comprises a plurality of elements representing probabilities that an error has occurred on the autonomous vehicle; determining that the element exceeds a predetermined threshold; and causing the autonomous vehicle to perform a corrective operation.

B. The system of Clause A, wherein elements of the array are predetermined and correspond to bins of a histogram that are determined by: calculating, based on reference measurement data, a set of further parameters representing respective differences between: differences between global measurements in the reference measurement data separated in time by a first time-window, and differences between one of ground truth data representing an actual course taken by a vehicle or inertial measurement data separated in time by the first time-window; aggregating the further parameters into the bins of the histogram based on the values of the further parameters, and normalizing the bins of the histogram.

C. The system of Clause B, wherein the reference measurement data represents a previous operation of another autonomous vehicle, different from the autonomous vehicle.

D. The system of any of Clauses A to C, further comprising: determining a change of the parameter over time; causing the vehicle to perform a corrective action based on the change.

E. A method comprising: receiving, from a first measurement system, first measurement data taken at a first time and second measurement data taken at a second time, different from the first time; receiving, from a second measurement system associated with the vehicle, third measurement data taken at the first time and fourth measurement data taken at the second time; determining a parameter based at least in part on: a first difference between the first measurement data and the second measurement data, and a second difference between the third measurement data and the fourth measurement data; determining a probability that an error has occurred in a vehicle based at least in part on the parameter; and controlling the vehicle based at least in part on the determined probability.

F. The method of Clause E, further comprising: determining an element in an array based on the parameter, the array comprising a plurality of elements representing respective probabilities that an error has occurred on the vehicle.

G. The method of any of Clause F, wherein the elements in the array are predetermined from reference measurement data representing a previous operation of one or more of the vehicle or another vehicle.

H. The method of Clause F, wherein the reference measurement data comprises data generated during a calibration procedure of a vehicle.

I. The method of Clause F, wherein the reference measurement data comprises ground truth data representing an actual course taken by a vehicle.

J. The method of any of Clauses F to I, wherein the array is predetermined from a statistical analysis of the reference data.

K. The method of any of Clauses E to J, further comprising: determining that the probability is above a predetermined threshold for a first period of time; and causing the vehicle to implement a corrective operation.

L. The method of any of Clauses E to K, further comprising: determining a change of the parameter with respect to time; and determining a probability that an error has occurred on the vehicle based on the change.

M. The method of any of Clauses E to L, further comprising: determining a set comprising a plurality of the parameters over a predetermined time period; and determining a probability of vehicle maintenance requirement based on the set.

N. One or more non-transitory computer-readable media storing instructions executable by one or more processors, wherein the instructions, when executed, cause the one or more processors to perform operations comprising: receiving, from a first measurement system associated with a vehicle, first measurement data taken at a first time and second measurement data taken at a second time, different from the first time; receiving, from a second measurement system associated with the vehicle, third measurement data taken at the first time and fourth measurement data taken at the second time, wherein the third and fourth measurement data correspond to the first and second measurement data; determining a probability that an error has occurred in the vehicle based on the first, second, third and fourth measurement data; and controlling the vehicle based at least in part on the determined probability.

O. The one or more non-transitory computer-readable media of Clause N, wherein the instructions cause the one or more processors to: determine a value in an array based on the parameter, the array comprising a plurality of values representing respective probabilities that an error has occurred on the vehicle.

P. The one or more non-transitory computer-readable media of Clause O, wherein the values in the array are predetermined from reference measurement data representing a previous operation of one or more of the vehicle or another vehicle.

Q. The one or more non-transitory computer-readable media of Clause O, wherein the reference measurement data comprises data generated during a calibration procedure of a vehicle.

R. The one or more non-transitory computer-readable media of Clause O, wherein the reference measurement data comprises ground truth data representing an actual course taken by a vehicle.

S. The one or more non-transitory computer-readable media of Clauses P to R, wherein the array is predetermined from a statistical analysis of the reference data.

T. The one or more non-transitory computer-readable media of any of Clauses N to S, wherein the instructions cause the one or more processors to: determine that the probability is above a predetermined threshold for a first period of time; and cause the vehicle to implement a corrective operation.

U. The one or more non-transitory computer-readable media of any of Clauses N to T, wherein the instructions cause the one or more processors to: determine a change of the parameter with respect to time; and determining a probability that an error has occurred on the vehicle based on the change.

V. The one or more non-transitory computer-readable media of any of Clauses N to U, wherein the instructions cause the one or more processors to: determine a set comprising a plurality of the parameters generated at different times; performing a look-up of the set in a library of predefined changes; and causing the vehicle to perform a corrective operation based on the performing of the look-up.

While the example clauses described above are described with respect to one particular implementation, it should be understood that, in the context of this document, the content of the example clauses can also be implemented via a method, device, system, computer-readable medium, and/or another implementation. Additionally, any of examples A-V may be implemented alone or in combination with any other one or more of the examples A-V.

What is claimed is:

1. A system comprising:
   one or more processors; and
   a memory storing processor-executable instructions that, when executed by the one or more processors, cause the system to perform operations comprising:
      receiving, from an inertial measurement system associated with an autonomous vehicle, first inertial measurement data taken at a first time and second inertial measurement data taken at a second time different from the first time, wherein the first and second inertial measurement data represent inertially measured positions of the autonomous vehicle at the respective first and second times;
      receiving, from a global measurement system associated with the autonomous vehicle, first global measurement data taken at the first time and second global measurement data taken at the second time, wherein the first and second global measurement data represent globally measured positions of the autonomous vehicle at the respective first and second times;
      calculating a parameter representing the difference between:
         the difference between the first and second inertial measurements, and
         the difference between the first and second global measurements;
      locating an element in an array based on the parameter, wherein the array comprises a plurality of elements representing probabilities that an error has occurred on the autonomous vehicle;
      determining that the element exceeds a predetermined threshold; and
      causing the autonomous vehicle to perform a corrective operation.

2. The system of claim 1, wherein elements of the array are predetermined and correspond to bins of a histogram that are determined by:
   calculating, based on reference measurement data, a set of further parameters representing respective differences between:
      differences between global measurements in the reference measurement data separated in time by a first time-window, and
      differences between one of ground truth data representing an actual course taken by a vehicle or inertial measurement data separated in time by the first time-window;
   aggregating the further parameters into the bins of the histogram based on the values of the further parameters, and
   normalizing the bins of the histogram.

3. The system of claim 2, wherein the reference measurement data represents a previous operation of another autonomous vehicle, different from the autonomous vehicle.

4. The system of claim 1, wherein the executable instructions, when executed by the one or more processors, further cause the system to perform operations comprising:
   determining a change of the parameter over time;
   causing the vehicle to perform a corrective action based on the change.

5. A method comprising:
   receiving, from a first measurement system, first measurement data taken at a first time and second measurement data taken at a second time, different from the first time;
   receiving, from a second measurement system associated with the vehicle, third measurement data taken at the first time and fourth measurement data taken at the second time;
   determining a parameter based at least in part on:
      a first difference between the first measurement data and the second measurement data, and
      a second difference between the third measurement data and the fourth measurement data;
   determining a probability that an error has occurred in a vehicle based at least in part on the parameter; and
   controlling the vehicle based at least in part on the determined probability.

6. The method of claim 5, further comprising:
   determining an element in an array based on the parameter, the array comprising a plurality of elements representing respective probabilities that an error has occurred on the vehicle.

7. The method of claim 6, wherein the elements in the array are predetermined from reference measurement data representing a previous operation of one or more of the vehicle or another vehicle.

8. The method of claim 7, wherein the reference measurement data comprises data generated during a calibration procedure of a vehicle.

9. The method of claim 7, wherein the reference measurement data comprises ground truth data representing an actual course taken by a vehicle.

10. The method of claim 8, wherein the array is predetermined from a statistical analysis of the reference data.

11. The method of claim 5, further comprising:
   determining that the probability is above a predetermined threshold for a first period of time; and
   causing the vehicle to implement a corrective operation.

12. The method of claim 5, further comprising:
   determining a change of the parameter with respect to time; and
   determining a probability that an error has occurred on the vehicle based on the change.

13. The method of claim 5, further comprising:
   determining a set comprising a plurality of the parameters over a predetermined time period; and
   determining a probability of vehicle maintenance requirement based on the set.

14. One or more non-transitory computer-readable media storing instructions executable by one or more processors, wherein the instructions, when executed, cause the one or more processors to perform operations comprising:
   receiving, from a first measurement system associated with a vehicle, first measurement data taken at a first time and second measurement data taken at a second time, different from the first time;
   receiving, from a second measurement system associated with the vehicle, third measurement data taken at the first time and fourth measurement data taken at the second time, wherein the third and fourth measurement data correspond to the first and second measurement data;
   determining a probability that an error has occurred in the vehicle based on the first, second, third and fourth measurement data; and
   controlling the vehicle based at least in part on the determined probability.

15. The one or more non-transitory computer-readable media of claim 14, wherein the instructions cause the one or more processors to:
   determine an element in an array based on the parameter, the array comprising a plurality of elements representing respective probabilities that an error has occurred on the vehicle.

16. The one or more non-transitory computer-readable media of claim 15, wherein the elements in the array are predetermined from reference measurement data representing a previous operation of one or more of the vehicle or another vehicle.

17. The one or more non-transitory computer-readable media of claim 16, wherein the reference measurement data comprises data generated during a calibration procedure of a vehicle.

18. The one or more non-transitory computer-readable media of claim 16, wherein the array is predetermined from a statistical analysis of the reference measurement data.

19. The one or more non-transitory computer-readable media of claim 14, wherein the instructions cause the one or more processors to:
   determine that the probability is above a predetermined threshold for a first period of time; and
   cause the vehicle to implement a corrective operation.

20. The one or more non-transitory computer-readable media of claim 14, wherein the instructions cause the one or more processors to:
   determine a change of the parameter with respect to time; and
   determine a probability that an error has occurred on the vehicle based on the change.

* * * * *